United States Patent
White et al.

(10) Patent No.: US 9,785,722 B2
(45) Date of Patent: Oct. 10, 2017

(54) SYSTEMS AND METHODS FOR REMOTE REPLAY OF USER INTERACTION WITH A WEBPAGE

(75) Inventors: Alexei R. White, Vancouver (CA); Andre D. Charland, North Vancouver (CA); David C. Johnson, North Saanich (CA); Mitchell Cohen, Ann Arbor, MI (US)

(73) Assignee: FORSEE RESULTS, INC., Ann Arbor, MI (US)

( * ) Notice: Subject to any disclaimer, the term of this patent is extended or adjusted under 35 U.S.C. 154(b) by 1020 days.

(21) Appl. No.: 13/075,636

(22) Filed: Mar. 30, 2011

(65) Prior Publication Data
US 2011/0246879 A1    Oct. 6, 2011

Related U.S. Application Data

(60) Provisional application No. 61/319,907, filed on Apr. 1, 2010.

(51) Int. Cl.
G06F 3/048 (2013.01)
G06F 17/30 (2006.01)

(52) U.S. Cl.
CPC ................ G06F 17/3089 (2013.01)

(58) Field of Classification Search
CPC .............. G06F 17/30905; G06F 3/048; G06F 11/3438; G06F 11/3476; G06F 11/3414
See application file for complete search history.

(56) References Cited

U.S. PATENT DOCUMENTS

| | | | |
|---|---|---|---|
| 5,999,908 A | 12/1999 | Abelow | |
| 6,877,007 B1 | 4/2005 | Hentzel et al. | |
| 7,043,546 B2 * | 5/2006 | Smith et al. | 709/224 |
| 7,133,834 B1 | 11/2006 | Abelow | |
| 7,222,078 B2 | 5/2007 | Abelow | |
| 7,370,269 B1 | 5/2008 | Prabhu et al. | |
| 7,620,565 B2 | 11/2009 | Abelow | |
| 2002/0143931 A1 * | 10/2002 | Smith et al. | 709/224 |
| 2003/0164850 A1 | 9/2003 | Rojewski et al. | |
| 2004/0054715 A1 | 3/2004 | Cesario | |

(Continued)

FOREIGN PATENT DOCUMENTS

| | | | |
|---|---|---|---|
| WO | WO 01/37125 A2 | 5/2001 | |
| WO | WO 0186483 A2 | 11/2001 | |
| WO | 2009/139994 A2 | 11/2009 | |

OTHER PUBLICATIONS

U.K. Patent Application No. GB1105539.9: Combined Search and Examination Report, dated Aug. 1, 2011.

(Continued)

Primary Examiner — Namitha Pillai
(74) Attorney, Agent, or Firm — Howard & Howard Attorneys PLLC

(57) ABSTRACT

A system and method for replaying a user's interaction with a webpage by requesting playback of user interaction data from a replay server, receiving a media asset from the replay server to allow playback the requested user interaction data, the media asset being pre-fetched for use by a proxy application, periodically requesting and receiving the user interaction data from the replay server, recreating an interaction visualization from the user interaction data, and playing back said interaction visualization based on data received from the replay server.

17 Claims, 6 Drawing Sheets

(56) References Cited

U.S. PATENT DOCUMENTS

| | | | |
|---|---|---|---|
| 2004/0267820 A1* | 12/2004 | Boss et al. | 707/104.1 |
| 2006/0123340 A1 | 6/2006 | Bailey et al. | |
| 2007/0106692 A1 | 5/2007 | Klein | |
| 2007/0250618 A1 | 10/2007 | Hammond | |
| 2008/0077671 A1 | 3/2008 | Rust | |
| 2010/0142447 A1* | 6/2010 | Schlicht | H04W 4/20 370/328 |
| 2012/0088573 A1* | 4/2012 | Hedrick et al. | 463/25 |

OTHER PUBLICATIONS

European Office Action; Date of Mailing: Jun. 12, 2014; 4 pages.
European Office Action; Date of Mailing: Sep. 17, 2013; 6 pages.

* cited by examiner

SYSTEMS AND METHODS FOR REMOTE REPLAY OF USER INTERACTION WITH A WEBPAGE

CROSS-REFERENCE TO RELATED APPLICATIONS

This application claims priority to U.S. Provisional Application Ser. No. 61/319,907, filed Apr. 1, 2010, which is incorporated herein by reference in its entirety.

This application hereby incorporates by reference in its entirety U.S. patent application Ser. No. 12/421,695 filed Apr. 10, 2009.

BACKGROUND OF THE INVENTION

The present inventions relate generally to systems and methods for capturing user interaction with a remote computer. More specifically, the present inventions relate to systems and methods for the remote capture and subsequent replay of user interaction with a remote computer or webpage.

It is desirable for companies conducting business online, such as by operating business related webpages over the Internet, to be able to observe and/or collect and analyze the interaction of certain users with their webpages. Commercial software for collecting and analyzing aspects of user interaction with webpages is known in the art. However, such known tools typically do not permit the collection or analysis of details of individual user interactions with a webpage, such as how an individual user completes a form on a webpage, or which parts of a webpage a user interacts with the most easily, or how a user navigates from one element of a webpage to another, for example.

Other software for remotely collecting and analyzing certain other details of individual user interactions with a webpage is known in the art. However, such known software typically requires that the host or service provider collect user interaction details and also provide the webpage to the user's computer. Such configurations increase the processing overhead on the webpage server and limits the ability of a third party service provider, such as a user interaction analysis service provider, from being able to collect user interaction data from the host server. Moreover, other approaches may provide a premade video rendering of such user interactions, which are typically large in size.

As a result of such limitations, it would be desirable to provide systems and methods that provide remote capture and replay of user interaction data that allows for the capture and serving of replay information by a service provider, and the replay of user interaction data with the webpage by a second remote computer, which is separate from the service hosting and serving the webpage to the user.

SUMMARY OF THE INVENTION

It is an object of the present invention to provide systems and methods for remote tracking of user interaction with a webpage that addresses some of the limitations of the prior art.

According to an embodiment of the invention, a computer readable medium is provided, comprising executable instructions to replay a user's interaction with a webpage, comprising: requesting playback of user interaction data from a replay server; receiving a media asset from the replay server to allow playback the requested user interaction data; the media asset being pre-fetched for use by a proxy application; periodically requesting and receiving the user interaction data from the replay server; recreating an interaction visualization from the user interaction data; and playing back said interaction visualization based on data received from the replay server.

Further advantages of the invention will become apparent when considering the drawings in conjunction with the detailed description.

BRIEF DESCRIPTION OF THE DRAWINGS

The system and method of the present invention will now be described with reference to the accompanying drawing figures, in which.

Like reference numerals refer to corresponding parts throughout the several views of the drawings.

DETAILED DESCRIPTION OF THE INVENTION

Figure 1:
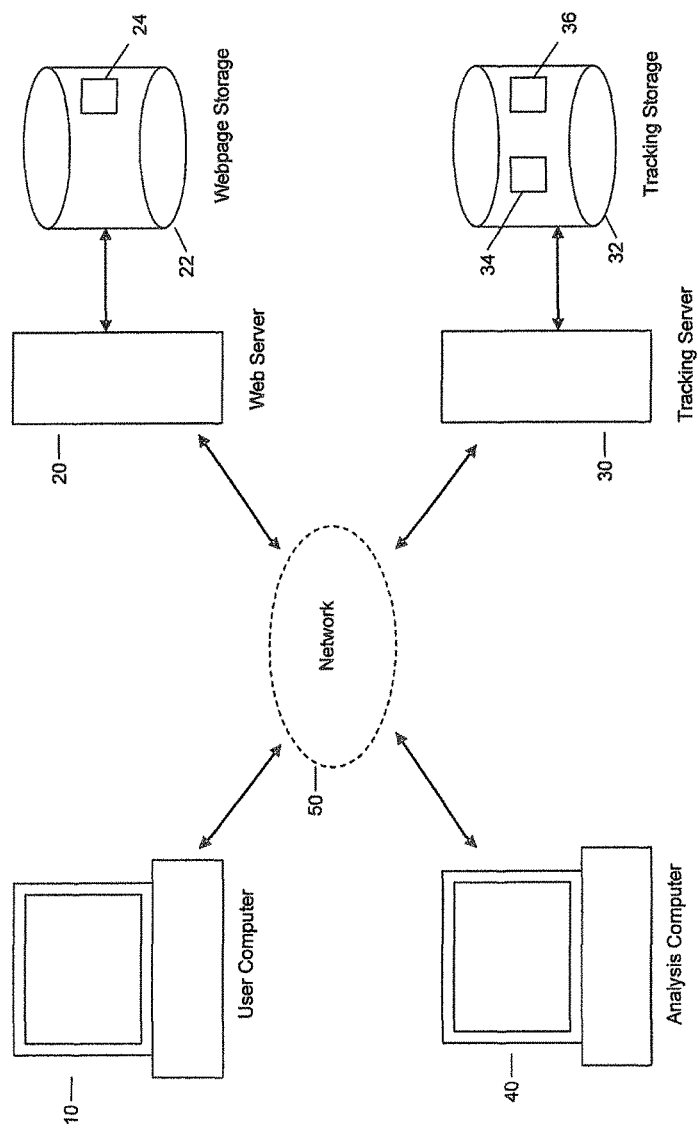
FIG. 1 illustrates an exemplary networked operating environment for implementing an embodiment of the present invention.

FIG. 1 illustrates an exemplary networked operating environment in which embodiments of the present invention may be implemented. The networked environment includes a user computer 10 connected to a communication network 50, which may include, for example, one or more of: a local area network (LAN), wide area network (WAN), world wide web (WWW), the Internet, such that user computer 10 may communicate with other computers similarly connected to network 50. Other computers connected to network 50 may include a web server 20, tracking server 30, and an analysis computer 40, which may each communicate with any other computer connected to network 50. User computer 10 includes standard computing components known in the art for transmitting and receiving data to and from other computers connected to the user computer 10 through network 50.

Similarly, web server 20 includes standard computing components known in the art for serving web pages to other computers over the network 50. In particular, web server 20 is connected to a webpage storage repository 22 which stores one or more webpage resources 24. Webpage storage repository 22 may include a conventional data storage device such as a hard disk or solid-state memory located with and connected directly to web server 20, or may include a remote data storage facility connected to web server 20. Webpage may include a single document, such as a hypertext document commonly written in a markup language such as HTML or XML, or may include multiple documents such as a multi-page website, which may be accessed by a user computer 10 connected to the web server 20 through network 50. Webpage may also include one or more scripts or commands for executing operations expressed in one or more known scripting languages such as JavaScript for example. Such scripts may be included in the webpage 24 when it is served to other computers by web server 20.

Tracking server 30 includes standard computing components known in the art for sending and receiving data to and from other computers connected to network 50. In particular, tracking server 30 is connected to a tracking storage repository 32. Tracking storage repository 32 may comprise a conventional data storage device such as a hard disk or solid-state memory located with and connected directly to tracking server 30, or may comprise a remote data storage facility connected to tracking server 30, such as a database.

Tracking storage repository 32 stores a tracking script 34 which may be expressed in a known scripting or command language such as JavaScript for example, and may include computer executable instructions to record and transmit interaction data related to the interaction of a user with a webpage, as described in greater detail below in reference to FIGS. 2-6. In some embodiments, the script may include a function call to one or more applications that may be used to communicate interaction data across network 50.

Tracking storage repository 32 may also store one or more tracking records 36 including such interaction data, which may be received from or transmitted to one or more computers connected to tracking server 30 through network 50, such as a user computer 10 or an analysis computer 40, for example.

It will be appreciated from the above that tracking server 30 and tracking storage 32 may be constructed in many forms (not shown). For example, these resources may be constructed from multiple, physically remote, stand alone platforms, with functions that may be distributed across such resources or may be integrated into one or more "single platforms" configured to perform the various different required functions as further described herein (e.g., through a partition or logical assignment).

Moreover, it will be further understood that server 30 and storage 32 may perform a variety of roles. For example, server 30 and storage 32 may receive tracking information regarding a user's interaction with a webpage as further described herein. However, server 30 and storage 32 may also perform certain other functions such as the replay of interaction data stored in storage 30 in response to a request for playback.

For example, a system analyst may desire to view user interactions at analysis computer 40 based on tracking data stored in storage 32. In this case, tracking server 30 may act as a "replay server" and fetch the tracking records from storage 32 and replay them for viewing on analysis computer 40. Thus, tracking server 30 and tracking storage 32 may be sometimes by referred to herein as "replay server" 30 or "replay storage" 32 depending on the role they perform.

Furthermore, it will be understood that server 30 and storage 32 may play dual roles, performing both replay and capture functions as needed. However, others may operate as substantially dedicated servers performing either replay or storage functions (not shown).

Similar to user computer 10, analysis computer 40 may includes standard computing components for transmitting and receiving data to and from other computers connected to the analysis computer 40 through network 50.

Figure 2:
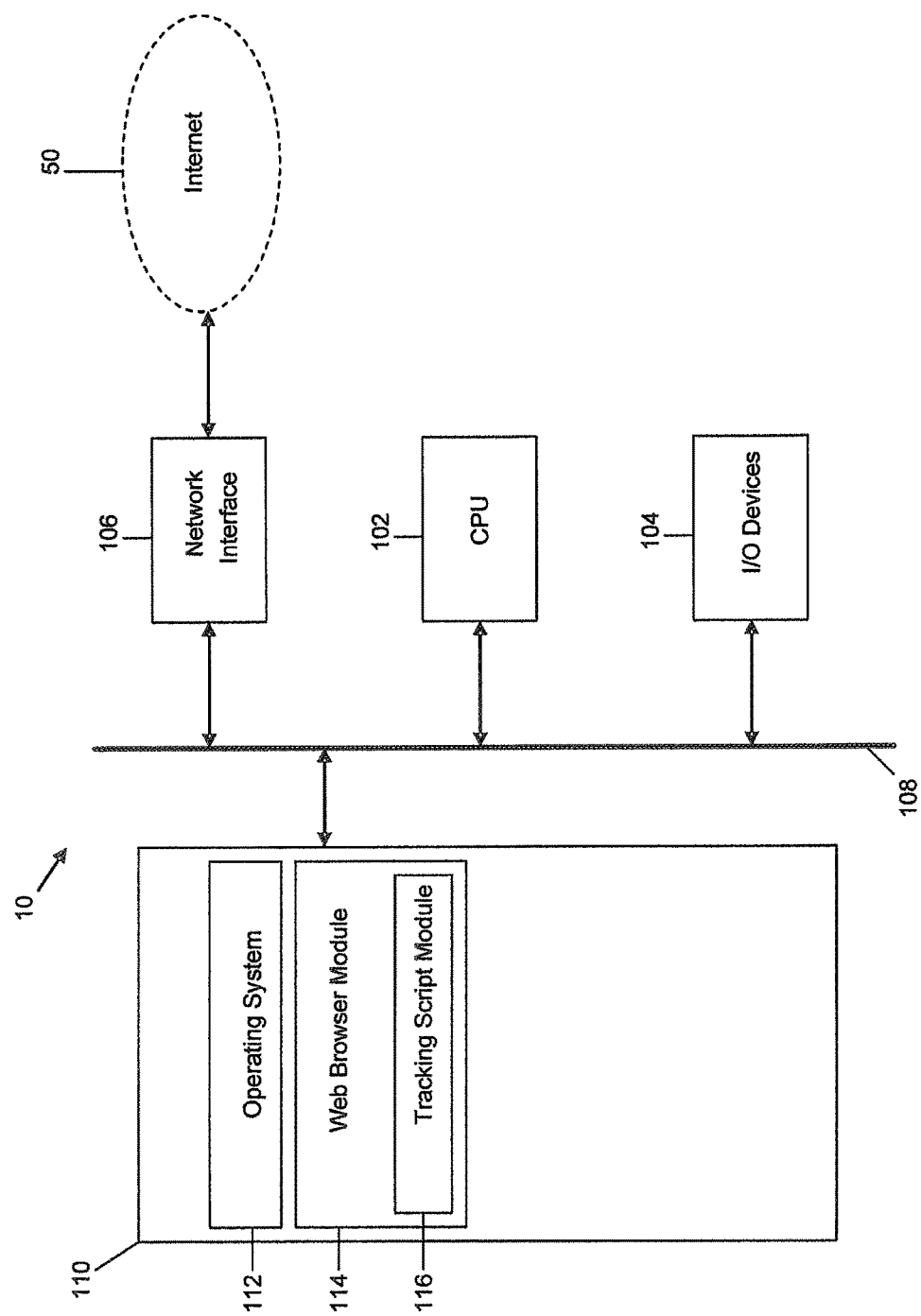
FIG. 2 illustrates an exemplary user computer architecture configured according to an embodiment of the invention.

FIG. 2 illustrates an exemplary computer architecture for a user computer 10 configured in accordance with an embodiment of the invention. According to an embodiment of the invention, analysis computer 40 as described above may also be configured similarly to the exemplary architecture of user computer 10 as illustrated in FIG. 2.

Computer 10 may include standard components, including a central processing unit 102 and input/output devices 104, which are linked by a bus 108. Input/output devices 104 may comprise a keyboard, mouse, touch screen, monitor, printer, and the like, for example. A network interface 106 is also connected to the bus 108. Network interface 106 provides connectivity to a network 50, such as the exemplary network 50 described above, thereby allowing the computer 100 to operate in a networked environment. Also connected to bus 108 is a computer-readable memory 110. Memory 110 stores executable instructions to implement some or all of the functions of the invention. Computer-readable memory 110 may comprise any available computer-readable media or device that can be accessed by computer 100.

In an embodiment of the invention, one or more of the following program modules and data files may be stored in the memory 110 of the computer 10: an operating system module 112, a Web browser module 114 and a tracking script module 116.

Operating system module 112 may be suitable for controlling the operation of a networked user or analysis computer, and in particular may include instructions for handling various system services, such as file services or for performing hardware dependant tasks. Operating system module 112 may also comprise instructions for standard computer operation, including receiving input from input devices such as a keyboard or mouse, and for displaying output in a graphical format on a monitor, for example.

Web browser module 114 may include instructions for browsing webpages provided by a web server or other source, such as instructions for requesting and receiving a webpage from a web server and displaying the webpage on a display device such as a monitor. Web browser module 114 also include instructions for receiving input from a user's interaction with a webpage such as from input devices like a keyboard and mouse for example, and for transmitting such user input to a web server. Web browser module 114 may also comprise instructions for executing processing commands comprised in webpages or other files such as scripts.

Tracking script module 116 may include instructions for recording interaction data input by a user in the process of interacting with a webpage, such as mouse movements, scrolling, clicks and keyboard entries, for example. In an embodiment of the invention, tracking script module 116 may also include instructions for processing such interaction data, and for transmitting processed interaction data to a remote tracking server 30, such as over network 50.

In some embodiments, tracking script module 116 may include instructions for receiving interaction data from a remote replay server 30, and for recreating and displaying an interaction visualization from the received interaction data (e.g., using certain known multimedia applications such as Windows Media Player or through the use of a client player application described further herein).

The above described program modules incorporate instructions to implement processing operations associated with the invention. Various embodiments of the processing operations of the above-described program modules are described below. The modules stored in memory 110 are exemplary, and additional modules can be included. It should be appreciated that the functions of the presented modules may be combined. In addition, a function of a module need not be performed on a single machine, instead, the function may be distributed across a network to one or more other computers if desired. For example, a playback application may be stored on a client computer, with interaction data provided to that computer for playback. This may be accomplished by the creation of a video or graphic rendering of user interaction at the client side based on interaction data provided.

Figure 3:
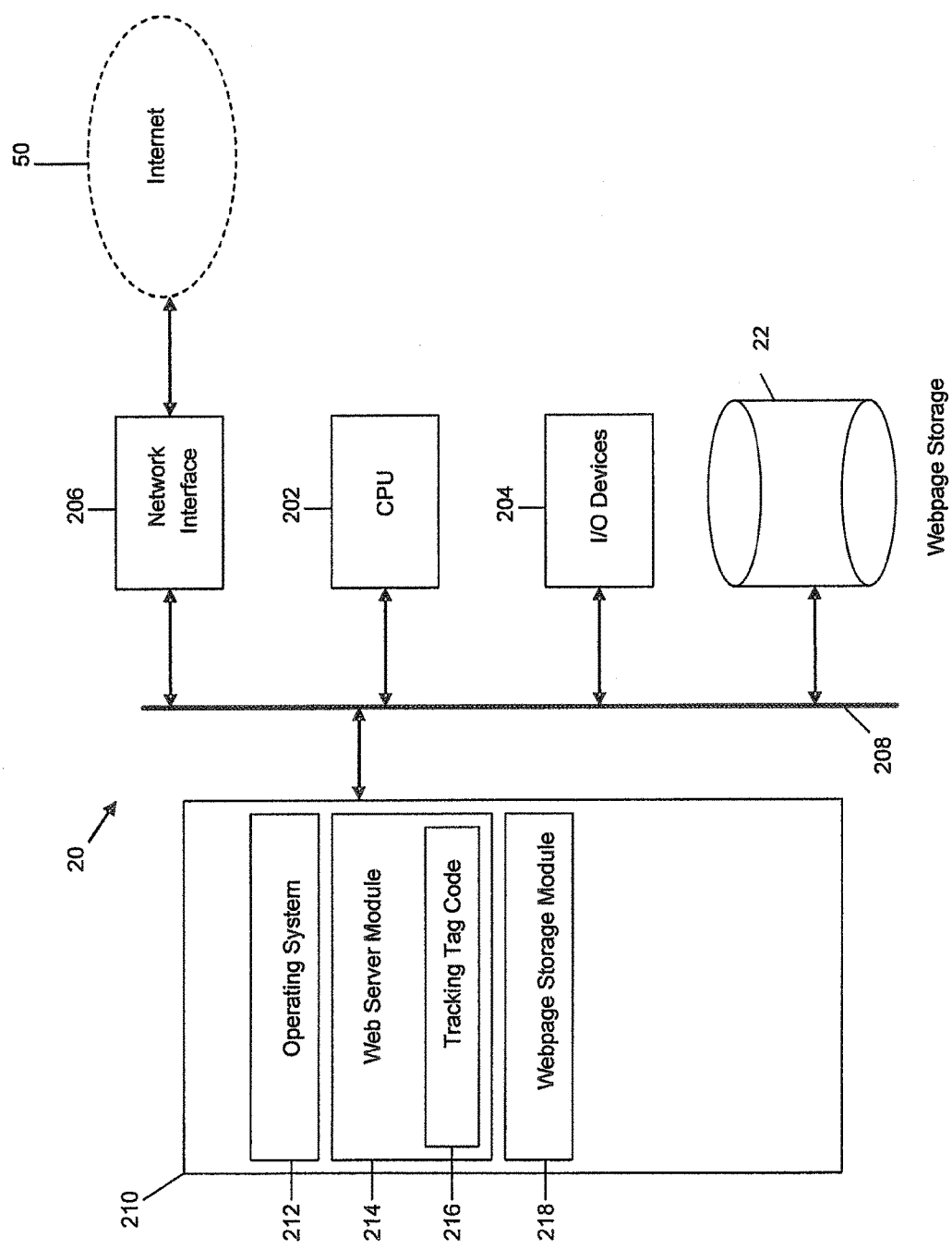
FIG. 3 illustrates an exemplary web server computer architecture configured according to an embodiment of the invention.

FIG. 3 illustrates an exemplary computer architecture for a web server computer 20, such as illustrated in the computer system of FIG. 1, configured in accordance with an embodiment of the invention. Computer 20 may include standard components known in the art, including a central processing unit 202 and input/output devices 204, which are linked by a bus 208. Input/output devices 204 may comprise a keyboard, mouse, touch screen, monitor, printer, and the like, for example. A network interface 206 is also connected to the bus 208. Network interface 206 provides connectivity to a network 50, such as the exemplary network 50 described above, thereby allowing computer 20 to operate in a networked environment.

Web server 20 also comprises a webpage storage repository 22 capable of storing one or more webpage resources. Webpage storage repository 22 may comprise a conventional data storage device such as a hard disk or solid-state memory located with and connected to web server 20 such as by bus 208 as shown in FIG. 3, or may alternately comprise a remote data storage facility accessibly connected to web server 20. Also connected to bus 208 is a computer-readable memory 210. Memory 210 stores executable instructions to implement functions of the invention. Computer-readable memory 210 may comprise any available computer-readable media or device that can be accessed by the computer 20.

In an embodiment of the invention, one or more of the following program modules and data files may be stored in memory 210 of the web server computer 20: an operating system module 212, a web server module 214, a tracking tag code module 216 and a webpage storage module 218.

Similar to module 112 described above, operating system module 212 may include instructions for handling various system services for web server computer 20, such as file services or for performing hardware dependant tasks. Operating system module 212 may also include instructions for standard computer operation, including receiving input from input devices such as a keyboard or mouse, and for displaying output in a graphical format on a monitor, for example.

Web server module 214 includes instructions for serving webpages requested by another computer, such as instructions for receiving a request for a webpage from a user computer, accessing the webpage, and serving the webpage to the requesting user computer, for example. Web server module 214 may also include instructions for receiving input from a user's interaction with a webpage, processing such input, and serving additional webpage content to a user computer in response.

In one embodiment, tracking tag code module 216 may be stored as a sub-module of web server module 214, and includes instructions for requesting a tracking script from a tracking server 30. The tracking tag code module may also include further instructions to add or attach instructions for requesting a tracking script from tracking server 30 to one or more webpages before they are served to user computers.

Webpage storage module 218 includes instructions for accessing webpage storage repository 22, such as for accessing and retrieving stored webpages and/or other stored resources, in response to requests for such webpages and/or resources from user computers, for example.

Figure 4:
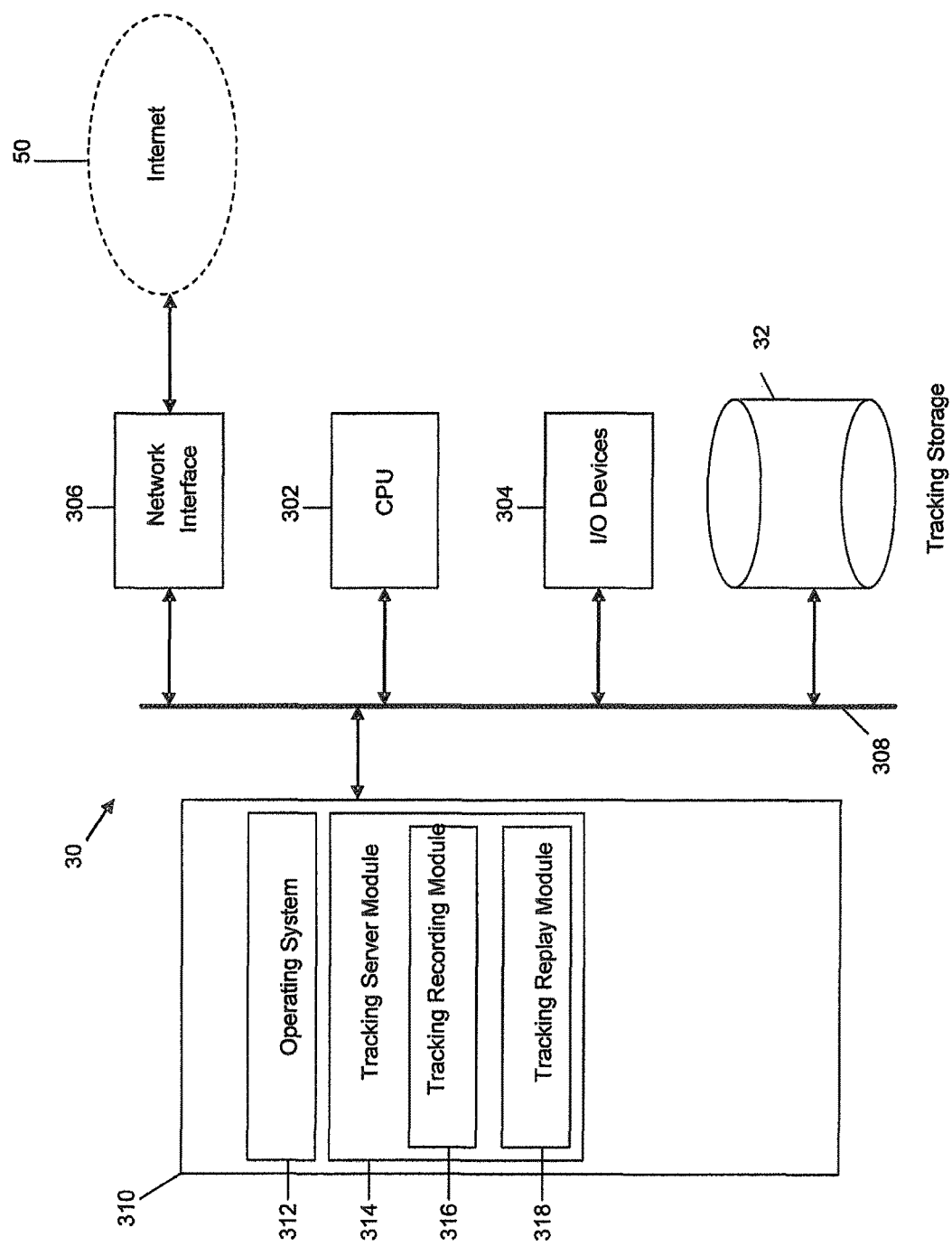
FIG. 4 illustrates an exemplary tracking server computer architecture configured according to an embodiment of the invention.

FIG. 4 illustrates an exemplary computer architecture for a tracking server computer 30, such as illustrated in the computer system of FIG. 1, configured in accordance with an embodiment of the invention. Computer 30 may include standard components known in the art, including a central processing unit 302 and input/output devices 304, which are linked by a bus 308. The input/output devices 304 may include a keyboard, mouse, touch screen, monitor, printer, and the like, for example. A network interface 306 is also connected to the bus 308. The network interface 306 provides connectivity to a network 50, such as the exemplary network 50 described above, thereby allowing the computer 30 to operate in a networked environment. Tracking server 30 also comprises a tracking storage repository 32 capable of storing one or more tracking scripts and/or tracking record resources, for example.

Tracking storage repository 32 may include one or more conventional data storage devices such as a hard disk, solid-state or optical memory located with and connected directly to web server 30 such as by bus 308 as shown in FIG. 4, or may alternately include a remote data storage facility accessibly connected to web server 30. Also connected to bus 308 is a computer-readable memory 310. Memory 310 stores executable instructions to implement functions of the invention. Computer-readable memory 310 may include any available computer-readable media or device that can be accessed by computer 30.

In an embodiment of the invention, one or more of the following program modules and data files may be stored in memory 310 of the tracking server computer 30: an operating system module 312, a tracking server module 314, a tracking recording module 316, and a tracking replay module 318.

Similar to module 112 described above, operating system module 312 may include instructions for handling various system services for tracking server 30, such as file services or for performing certain hardware or application dependant tasks. Operating system module 312 may also include instructions for standard computer operation, including receiving input from input devices such as a keyboard or mouse, and for displaying output in a graphical format on a monitor, for example.

Tracking server module 314 includes instructions for receiving a request for a tracking script from a user computer, accessing the tracking script, and transmitting a tracking script to the user computer. In one embodiment, the tracking script or other suitable tracking code may be stored in tracking storage repository 32. Furthermore, tracking server module 314 includes instructions for accessing tracking storage repository 32 to retrieve the tracking script or other suitable tracking code.

As shown in FIG. 4, tracking server module 314 may further include tracking server module 316 as a sub-module or embedded application. Tracking recording module 316 includes instructions to receive user interaction data transmitted by a user computer, and to record such data as one or more tracking records or data structures. In one embodiment, such tracking records may be stored in tracking storage repository 32, for example. In other embodiments, tracking recording module 316 may also include instructions for analyzing user interaction data received from a user computer.

Tracking server module 314 may also further include a tracking replay module 318 as a sub-module or embedded application. Tracking replay module 318 includes instructions for receiving a request to provide one or more tracking records from an analysis computer, accessing the one or more tracking records, such as from tracking storage repository 32, and for transmitting recorded user interaction data to analysis computer 40. In one embodiment, tracking replay module 318 may further include instructions to process and/or transform user interaction data retrieved from one or more tracking records, prior to transmitting the data to the an analysis computer. For example, in some embodiments, tracking replay module 318 may include code or routines that facilitate the playback of captured interaction data.

Tracking replay module 318 may further include code or routines that improve the quality or comprehensiveness of the replay experience. For example, data captured by recording module 316 may be in varying formats and/or may be captured with limited metadata or background information. This may limit the quality and/or ability to consistently or accurately replay user session data.

Accordingly, the system of the present invention may capture certain information relating to the details regarding the browsing session to be recreated. Thus, when it is desired to playback the interaction data at a playback computer, this information may be provided initially to recreate the playback environment at the playback web browser. This information may include, but is not limited to: The web browser was used to record the session; when the session was recorded; How the long the browsing session lasted; The initial screen dimensions; How much mouse movement there was; Whether or not there was keyboard involvement in the session; What pages were visited and times Spent on each page; The amount of activity on a certain time-basis with which to generate an activity histogram of the session; The account ID of the customer to whom the session belongs, etc. Any other similar information may also be provided, if desired.

Such information may be provided to the playback computer prior to the replay of user interaction data as a browser initialization file. In some embodiments, this may be called an .FSR file and may include metadata captured from the source webpage. When the client player loads such an initialization file, it deserializer this information and makes a request on replay module 318 to deliver the actual web page content and animation data. A media player on the playback computer may then use a standard web browser or embedded web browser to replay the session and display it to a user.

Tracking replay module 318 may further include routines that normalize the different data formats received by module 316 to permit accurate or consistent replay and may further include certain "proxy" routines to collect information to further facilitate and improve the playback experience.

Such normalization functions may include, but are not limited to: taking screenshots of the page, rewriting image URL's to point to the correct location of an image; document write calls are removed or masked; AJAX requests are rewritten to use custom AJAX class requests rather than native browser HTTP requests; JavaScript errors known to cause errors are rewritten using heuristics; known third party components such as JQuery are supplanted with customized versions that function better in the replay environment, etc.

In some embodiments, proxy routines may retrieve certain additional information such as environment, content, background, driver or other related webpage information such as a document object model "DOM" (the "additional features" information) not related to user interaction. In some embodiments, this information id captured at substantially the same time as the user interaction data, and may be stored as part of the initialization file described above.

In other embodiments, this information may not have been captured along with the user interaction due to the size of the information, based on the relatively static nature of the information, due the information already existing in tracking storage 32, due to the specific coding of the tracking script, or based on other factors.

In this case, such proxy routines may seek this additional features information from various sources such as the Internet or other network locations to facilitate replay of user interaction data. This may be referred to as a "remote proxy." In some embodiments, such additional features data may be automatically obtained at some point after associated user interaction data is transmitted to tracking storage 32. In other embodiments, such additional features data may be obtained when playback of that user interaction data is requested (or somewhat before, based on expected replay to prevent excessive system latency).

Moreover, the client playback computer may perform certain scaling functions in order to ensure the recreated webpage is properly rendered in view of the, size resolution, and aspect ratio of the client computer. Because the source webpage may differ in these respects from that found in the playback computer, the conversion is desirable. One way this may be accomplished is to position a browser window at the playback computer off-screen and then copy bitmaps from the browser to the player windows at a high framerate, scaling them in the process. Another way this may be accomplished is to use the screenshots of the page taken during the normalization process and rescale them. In some embodiments, known interpolation techniques may be also be used, if desired.

In some embodiments, as described above, the additional features data may have been captured at the time the user interaction data was captured. In this case, this information may be retrieved from tracking storage 32 when replay is requested. This may be referred to as a "local proxy." In other embodiments, some additional features information may be captured with user interaction data, while others are not. In this case, proxy routines in tracking replay module 318 may first poll storage 32 for the additional features data. If it is not present in storage 32, the information may be automatically sought as described above (i.e., start with a local proxy and expand to remote proxy, if necessary (or desired)).

Figure 5:
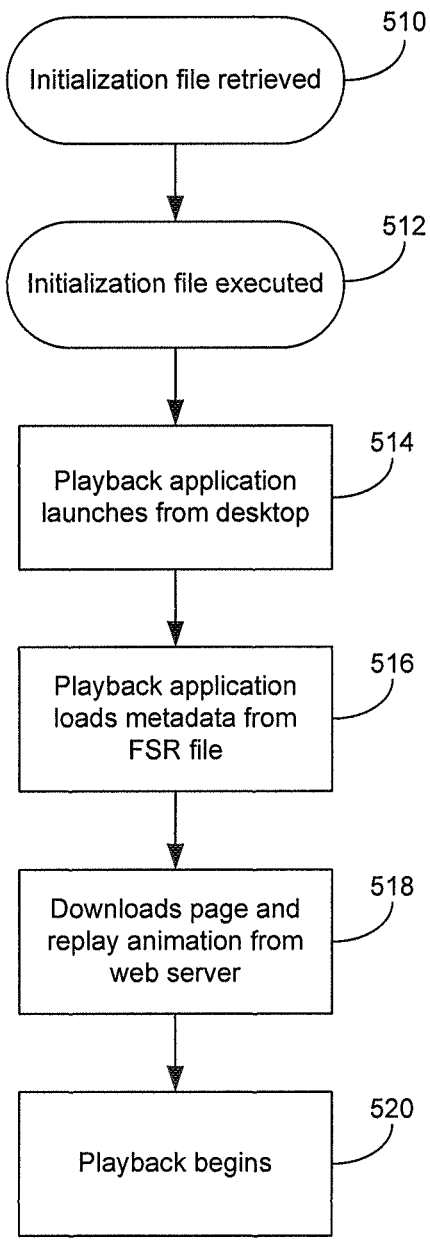
FIG. 5 illustrates a series of processing operations associated with an embodiment of the invention.

FIG. 5 illustrates a series of processing operations that may be implemented by the system illustrated in FIG. 1, and the exemplary computers illustrated in FIGS. 2-4, according to an embodiment of the invention. In the first processing operation 510 of FIG. 5, a user requests to playback file from the replay module 318, using, for example, a local web browsing application. Next, at step 512, module 318 provides an initialization file described above to the requesting computer. At step 514, the initialization file is loaded, launches a playback application and the playback computer.

In some embodiments, this may involve the use of a specialized browser or player designed to accept and process the initialization file for creating an appropriate playback rendering construct for interaction data.

At step 516, the playback application loads the data and/or metadata from the initialization file, which at least partially recreates the native browsing environment. Next, at step 518, webpage and animation information is downloaded from replay module 318. Afterwards, playback begins at step 520.

Figure 6:
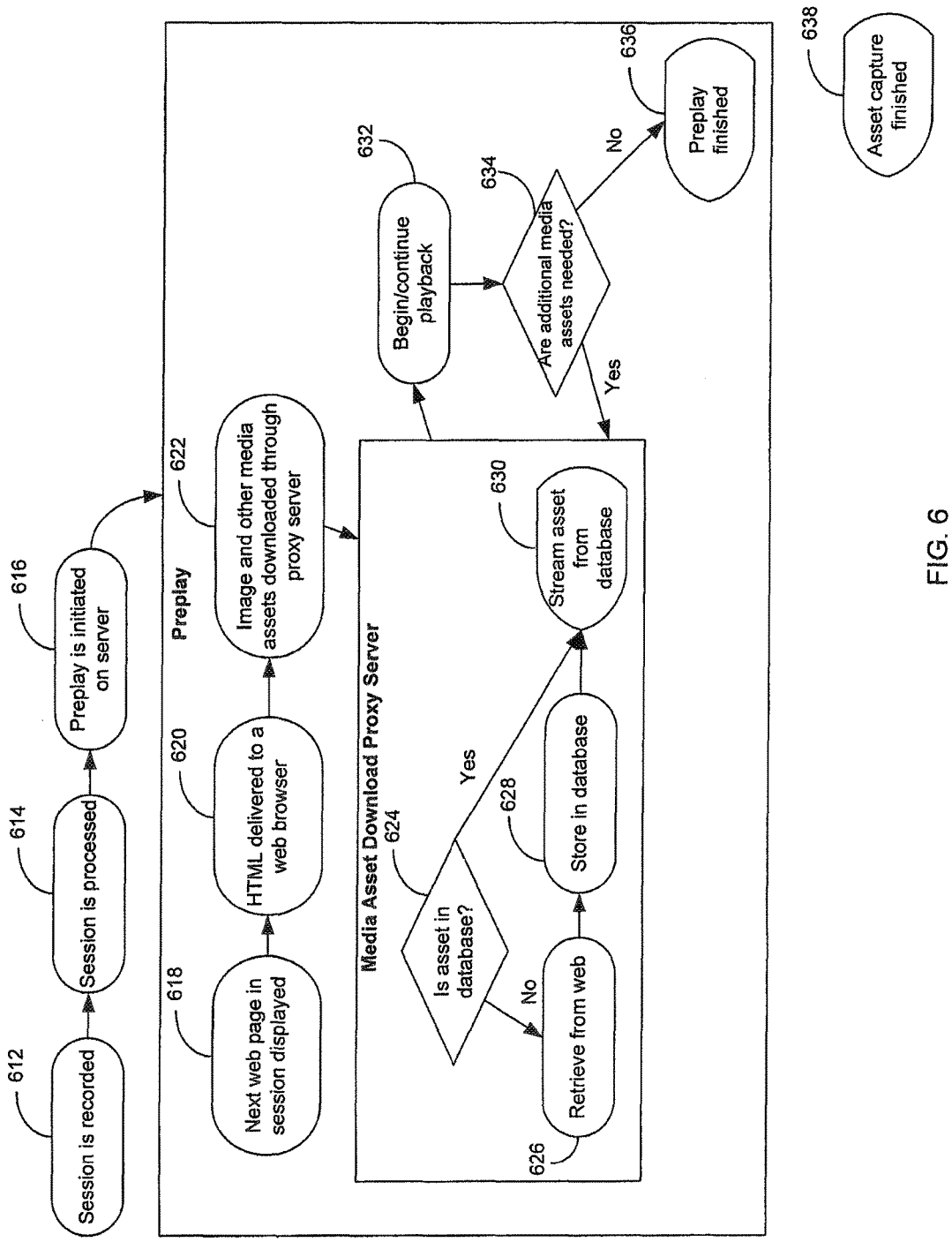
FIG. 6 illustrates a series of processing operations implemented by a user computer associated with an embodiment of the invention.

FIG. 6 illustrates a series of processing operations that may be implemented by web browser module 114 of user computer 10 illustrated in FIG. 2, in accordance with an embodiment of the invention. More particularly, once interaction data is captured as described above at step 612, it may be preprocessed at step 614, such that the playback data, and any associated metadata, may provided to the playback computer as further described herein.

However, to ensure that sufficient data has been captured to allow playback, aspects of the present invention may further employ certain asset capture steps to acquire certain necessary information. These steps are preferably be performed substantially at the time of data capture to improve the likelihood the acquired information is useful for rendering interaction data. Nevertheless, any missing information may be acquired afterwards if necessary. For example, at step 616, the system of the present invention may attempt to pre-play stored interaction data to determine whether sufficient information has, in fact, been captured.

At step 618, a high speed playback of a given interaction record may be attempted, which HTML code representing the webpage delivered to the playback browser (step 620). Next, at step 622, required image and other media assets are downloaded through a proxy server. At step 624, If the media assets are present in module 318, it is provided to the playback computer at step 630 and playback continues (step 632). If the media asset is not present, the proxy application retrieves it from the web (step 626) through a custom proxy server in module 318 and stores is for future use in module 318 (step 628).

Once this process has been completed for a given playback record, the asset capture process is complete (step 634). At this point, there is a high degree of confidence that the user will have the required media assets to playback the playback record.

More specifically, at this point, every part of the replay including any images, javascript files, CSS documents, Flash movies, Silverlight movies or Screenshots should be stored in a replay database for subsequent use. When replays are requested by the client player application, these versions of the assets are delivered instead of contemporaneously seeking the originals from the web. In the case of what are called "relative requests" or requests that do not specify a fully qualified URL (eg: "../img.gif" instead of "http://mysite.com/img.gif") a process called a "404 Handler" may be employed which catches these requests in a proxy server and relays them to the browser. In the process they are stored in the database for next time.

An embodiment of the present invention relates to a computer storage product with a computer-readable medium having computer code thereon for performing various computer-implemented operations. The computer-readable media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using XML, JavaScript, C, C++, or other scripting, markup and/or programming languages and development tools. Another embodiment of the invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for facilitating remote replay of a user interaction with a webpage, the user interaction occurring from a user computer being connected over a network to a server hosting the webpage, the user computer comprising a web browser and input/output devices, the webpage being an HTML document including dynamic elements being configured to execute operations that write modifications to the HTML document, and with a tracking script providing instructions to the web browser to record a tracking record and with the tracking record including information regarding the input/output devices, the system comprising:
 a tracking server communicating over the network with at least one of the user computer and the server and being configured to fetch, from at least one of the user computer and the server, the tracking record comprising the user interaction with the webpage and including the dynamic elements of the webpage; and
 an analysis computer communicating with the tracking server over the network;
 wherein the tracking server is configured to normalize the tracking record by removing modifications written to the HTML document by operations executed with the dynamic elements; and
 wherein the analysis computer requests the normalized tracking record from the tracking server to create an interaction visualization based on the normalized tracking record to replay the user interaction with the webpage.

2. The system of claim 1, wherein the input/output devices are at least one of a keyboard, a mouse, a touch screen, a monitor, and a printer.

3. The system of claim 2, wherein the tracking record includes at least one of mouse movements, mouse scrolling, mouse clicks and keyboard entries.

4. The system of claim 1, wherein the server comprises:
 a webpage storage module storing the webpage; and
 a tracking tag code module instructing the server to include a tracking script to the stored webpage before serving to the user computer,
 wherein the tracking script records the tracking record.

5. The system of claim 1, wherein the tracking server is configured to further provide playback environment data to the analysis computer, wherein the playback environment data is at least one of a brand of a web browser used to record the tracking record, a time and a date of the tracking record, a length of time of the tracking record, the webpage visited, a time spent on the webpage, an account ID of the user, and any physical inputs made at the user computer.

6. The system of claim 1 wherein the dynamic elements comprise at least one of scripts and commands.

7. The system of claim 1 wherein the dynamic elements comprise JavaScript.

8. The system of claim 1 wherein the operations that write modifications to the HTML document further comprise AJAX requests and wherein the tracking server is further configured to normalize the tracking record by removing the AJAX requests.

9. The system of claim 1 wherein the tracking server comprises a tracking replay module comprising routines being configured to normalize different data formats to enable accurate or consistent replay of the user interaction.

10. A computer-implemented method for utilizing a tracking server to facilitate remote replay of a user interaction with a webpage, the user interaction occurring from a user computer being connected over a network to a server hosting the webpage, the user computer comprising a web browser and input/output devices, the webpage being an HTML document including dynamic elements for executing operations that write modifications to the HTML document, and with a tracking script providing instructions to the web browser to record a tracking record and with the tracking record including information regarding the input/output devices, the computer-implemented method comprising:
    fetching, with the tracking server, the tracking record from at least one of the user computer and the server and with the tracking record comprising the user interaction with the webpage and including the dynamic elements of the webpage;
    normalizing, with the tracking server, the tracking record by removing modifications written to the HTML document by operations executed with the dynamic elements; and
    providing, with the tracking server, the normalized tracking record to an analysis computer to create an interaction visualization based on the normalized tracking record to replay the user interaction with the webpage.

11. The computer-implemented method of claim 10, wherein the tracking record includes at least one of mouse movements, mouse scrolling, mouse clicks and keyboard entries.

12. The computer-implemented method of claim 10, wherein the tracking server further provides playback environment data to the analysis computer, wherein the playback environment data is at least one of a brand of a web browser used to record the tracking record, a time and a date of the tracking record, a length of time of the tracking record, the webpage visited, a time spent on the webpage, an account ID of the user, and any physical inputs made at the user computer.

13. The computer-implemented method of claim 10 wherein the dynamic elements comprise at least one of scripts and commands.

14. The computer-implemented method of claim 10 wherein the dynamic elements comprise JavaScript.

15. The computer-implemented method of claim 10 wherein the operations that write modifications to the HTML document further comprise AJAX requests and wherein the tracking server further normalizes the tracking record by removing the AJAX requests.

16. The computer-implemented method of claim 10 wherein the tracking server comprises a tracking replay module comprising routines for normalizing different data formats to enable accurate or consistent replay of the user interaction.

17. A non-transitory computer-readable medium having stored thereon computer-executable instructions to facilitate remote replay of a user interaction with a webpage, the user interaction occurring from a user computer being connected over a network to a server hosting the webpage, the user computer comprising a web browser and input/output devices, the webpage being an HTML document including dynamic elements for executing operations that write modifications to the HTML document, and with a tracking script providing instructions to the web browser to record a tracking record and with the tracking record including information regarding the input/output devices, the computer-executable instructions, when executed by one or more processors, are configured to:
    fetch the tracking record from at least one of the user computer and the server and with the tracking record comprising the user interaction with the webpage and including the dynamic elements of the webpage;
    normalize the tracking record by removing modifications written to the HTML document by operations executed with the dynamic elements; and
    provide the normalized tracking record to an analysis computer to create an interaction visualization based on the normalized tracking record to replay the user interaction with the webpage.

* * * * *

UNITED STATES PATENT AND TRADEMARK OFFICE
CERTIFICATE OF CORRECTION

PATENT NO. : 9,785,722 B2
APPLICATION NO. : 13/075636
DATED : October 10, 2017
INVENTOR(S) : Alexei R. White et al.

Page 1 of 1

It is certified that error appears in the above-identified patent and that said Letters Patent is hereby corrected as shown below:

On the Title Page

In the Assignee:
Please delete "FORSEE RESULTS, INC." and add: --FORESEE RESULTS, INC.--

Signed and Sealed this
Fifth Day of June, 2018

Andrei Iancu
*Director of the United States Patent and Trademark Office*